(12) United States Patent
Wang et al.

(10) Patent No.: US 7,633,032 B2
(45) Date of Patent: Dec. 15, 2009

(54) SYSTEM AND METHOD FOR CLAMPING AND RESISTANCE WELDING

(75) Inventors: Pei-Chung Wang, Troy, MI (US); Scott E. Deal, Warren, MI (US); James W. Wells, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 525 days.

(21) Appl. No.: 11/178,171

(22) Filed: Jul. 8, 2005

(65) Prior Publication Data
US 2007/0007253 A1    Jan. 11, 2007

(51) Int. Cl.
B23K 11/11 (2006.01)
B23K 11/31 (2006.01)

(52) U.S. Cl. .................. 219/86.22; 219/86.25; 219/161

(58) Field of Classification Search .............. 219/86.22, 219/86.1, 91.23, 117.1, 119, 120, 78.01, 219/86.25, 86.31, 86.33, 86.7, 764, 161; 156/273.9; 901/42
See application file for complete search history.

(56) References Cited

U.S. PATENT DOCUMENTS

| | | | | |
|---|---|---|---|---|
| 1,281,454 A | * | 10/1918 | White | 219/119 |
| 2,387,905 A | * | 10/1945 | Hoeh | 219/119 |
| 2,979,599 A | * | 4/1961 | Width | 219/161 |
| 3,348,018 A | * | 10/1967 | Wood | 219/119 |
| 4,114,016 A | * | 9/1978 | Toma et al. | 219/161 |
| 4,831,228 A | * | 5/1989 | Schumacher | 219/86.22 |
| 5,360,958 A | * | 11/1994 | Bogue et al. | 219/86.51 |
| 6,008,463 A | * | 12/1999 | Aoyama et al. | 219/119 |
| 2005/0029233 A1 | * | 2/2005 | Schuhen | 219/86.22 |

FOREIGN PATENT DOCUMENTS

| | | | | |
|---|---|---|---|---|
| JP | 63-183781 A | * | 7/1988 |
| JP | 7-9165 A | * | 1/1995 |
| JP | 10-291077 A | * | 11/1998 |
| JP | 2002-35952 A | * | 2/2002 |
| JP | 2002-239748 A | * | 8/2002 |

* cited by examiner

Primary Examiner—Geoffrey S Evans

(57) ABSTRACT

An improved spot welding system for clamping and welding a plurality of workpieces at predetermined datum locations includes a clamping element, and at least one electrode. The preferred electrode(s) and element are concentrically alignable during engagement, and configured to produce an annular weld about the datum location. More preferably, the workpieces define an opening at the datum location, the element includes an insulated pin at least a portion of which is configured to pass-through the opening, and the electrode defines an inner space configured to receive the portion of the pin, when the electrode and element fully engage the workpieces.

13 Claims, 3 Drawing Sheets

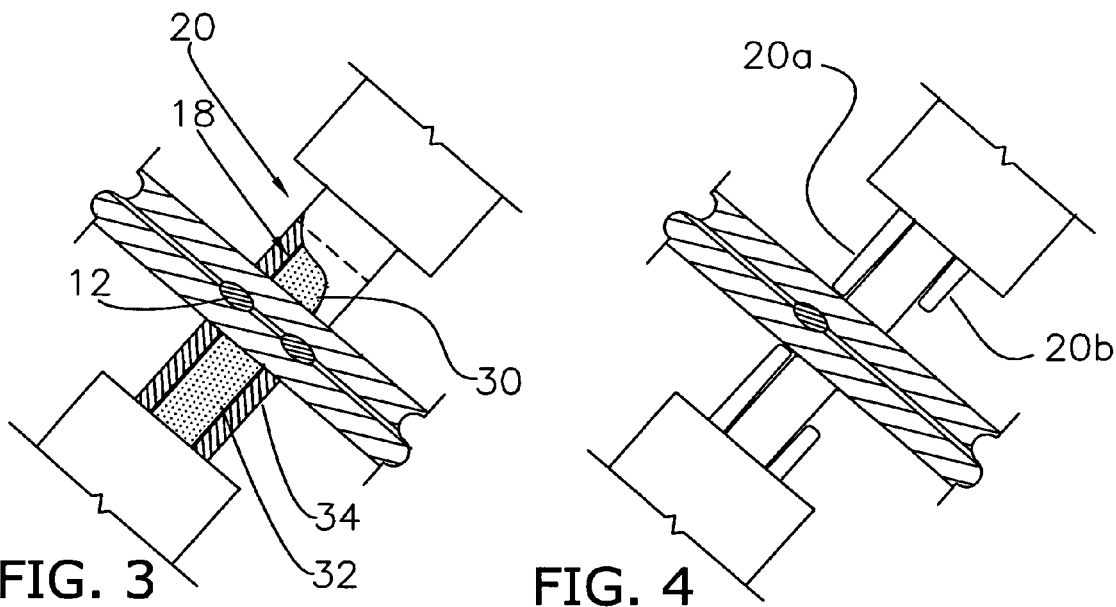
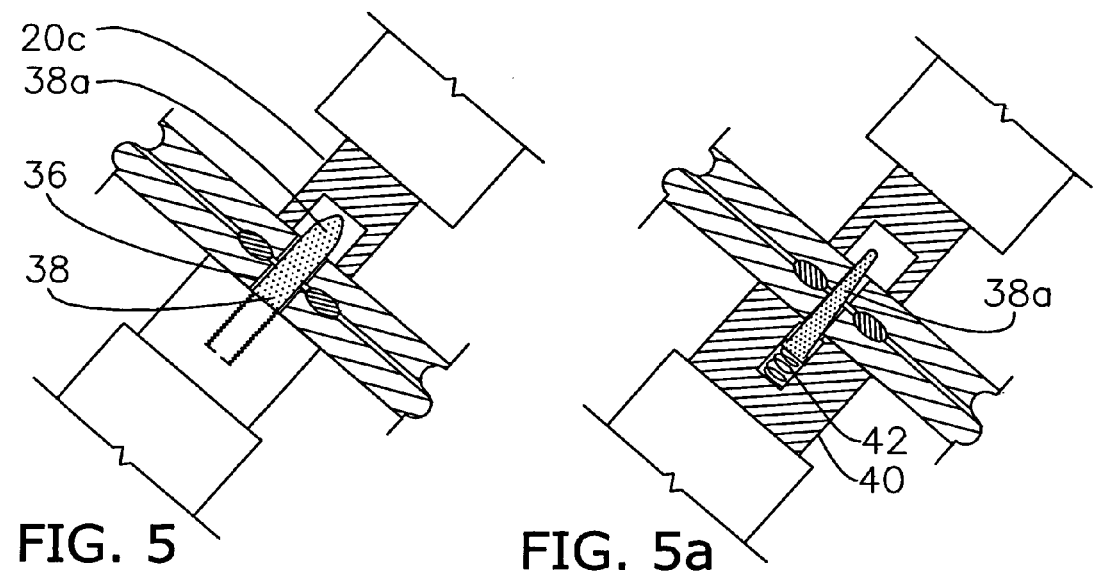

SYSTEM AND METHOD FOR CLAMPING AND RESISTANCE WELDING

BACKGROUND OF THE INVENTION

1. Field of the Invention

The present invention relates to systems for and methods of joining a plurality of workpieces, and more particularly to an improved resistance spot welding system and method for reducing workpiece deformation.

2. Discussion of Prior Art

Resistance spot welding devices are used in various industrial applications, including automotive vehicle body construction. These systems function to transmit an electric current through a plurality of adjacently secured workpieces, such that the resistance of the workpieces generates sufficient heat energy to produce a spot weld therebetween. The assembly is initially secured by first positioning the workpieces in a desired configuration, and then utilizing fixtures to clamp the workpieces together. A typical fixture consists of various types of tooling elements that accurately locate and orient the workpieces with respect to the tool path and restrains workpiece motion in the presence of welding electrode forces.

In automotive sheet metal assembly, part positioning and clamping are typically facilitated by programmable robots within an assembly cell. While a first set of robots apply clamping elements to the workpieces at predetermined datum locations, a separate set of welding robots apply electric current to the workpieces to produce a plurality of dimension control welds (DCW's). The datum locations are typically verified during the construction and installation of the assembly cell, and the DCW's are typically produced as close to the datum locations as possible to minimize workpiece deformation. Due to equipment size and configuration, however, the electrodes are typically unable to produce these welds adjacent the datum location, and must therefore engage the workpieces at locations spaced a minimum distance from the datum locations. Applying compressive welding forces at these non-datum locations result in workpiece deformation, which reduces vehicle dimensional accuracy.

These multi-apparatus systems also present various manufacturing concerns, including overcrowding of floor and three-dimensional space within the assembly cell, increased tooling costs, and longer cycle time. While the former concern directly impacts convenience and efficiency, the later concerns affect overall costs of production.

Accordingly, there is a need in the art for an improved system and method for spot welding a plurality of workpieces that reduces production costs and workpiece deformation.

BRIEF SUMMARY OF THE INVENTION

Responsive to these and other concerns caused by conventional spot welding systems, the present invention concerns an improved system for reducing workpiece deformation resulting from spot welding. Among other things, the invention provided hereof, is also useful for reducing assembly cell congestion.

A first aspect of the present invention broadly concerns a system for clamping and resistance spot welding a plurality of workpieces. The system includes a clamping element configured to engage the workpieces at a first location, and retain the workpieces in a relatively fixed position. An electrode is configured to engage by applying pressure to and passing an electric current through a section of the workpieces. The section is substantially adjacent the first location.

A second aspect of the present invention concerns a method of joining a plurality of workpieces. At least one datum location for clamping the workpieces is determined, so as to minimize workpiece deformation due to clamping. The workpieces are secured in a fixed relative position, by engaging the workpieces at said at least one datum location. Finally, the workpieces are joined substantially adjacent said at least one datum location, so as to minimize workpiece deformation due to joining.

It will be understood and appreciated that the present invention provides a number of advantages over the prior art, including, for example, providing localized impression of the workpieces by clamping and subsequently joining the workpieces in substantial adjacent configuration. Producing a radially symmetric weld around the datum location results in a more even distribution of force through the workpiece, and therefore reduces warping, bending, and other deformation.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

Preferred embodiments of the invention are described in detail below with reference to the attached drawing figures, wherein:

FIG. 3 is a cross-sectional fragmentary view of the workpieces, clamping element and electrode shown in FIGS. 1 and 2, particularly illustrating a continuous wall electrode and blunt end element;

FIG. 4 is a cross-sectional fragmentary view of the a plurality of workpieces, a clamping element, and an electrode in accordance with a preferred embodiment of the present invention, particularly illustrating a plurality of electrodes in radial symmetry with the element;

FIG. 5 is a cross-sectional fragmentary view of a plurality of workpieces, a clamping element and an electrode in accordance with a preferred embodiment of the present invention, particularly illustrating a clamping element having an insulated pin; and FIG. 5a is an alternative embodiment of the clamping element shown in FIG. 5, particularly illustrating a retractable pin.

DETAILED DESCRIPTION OF THE INVENTION

Figure 1:
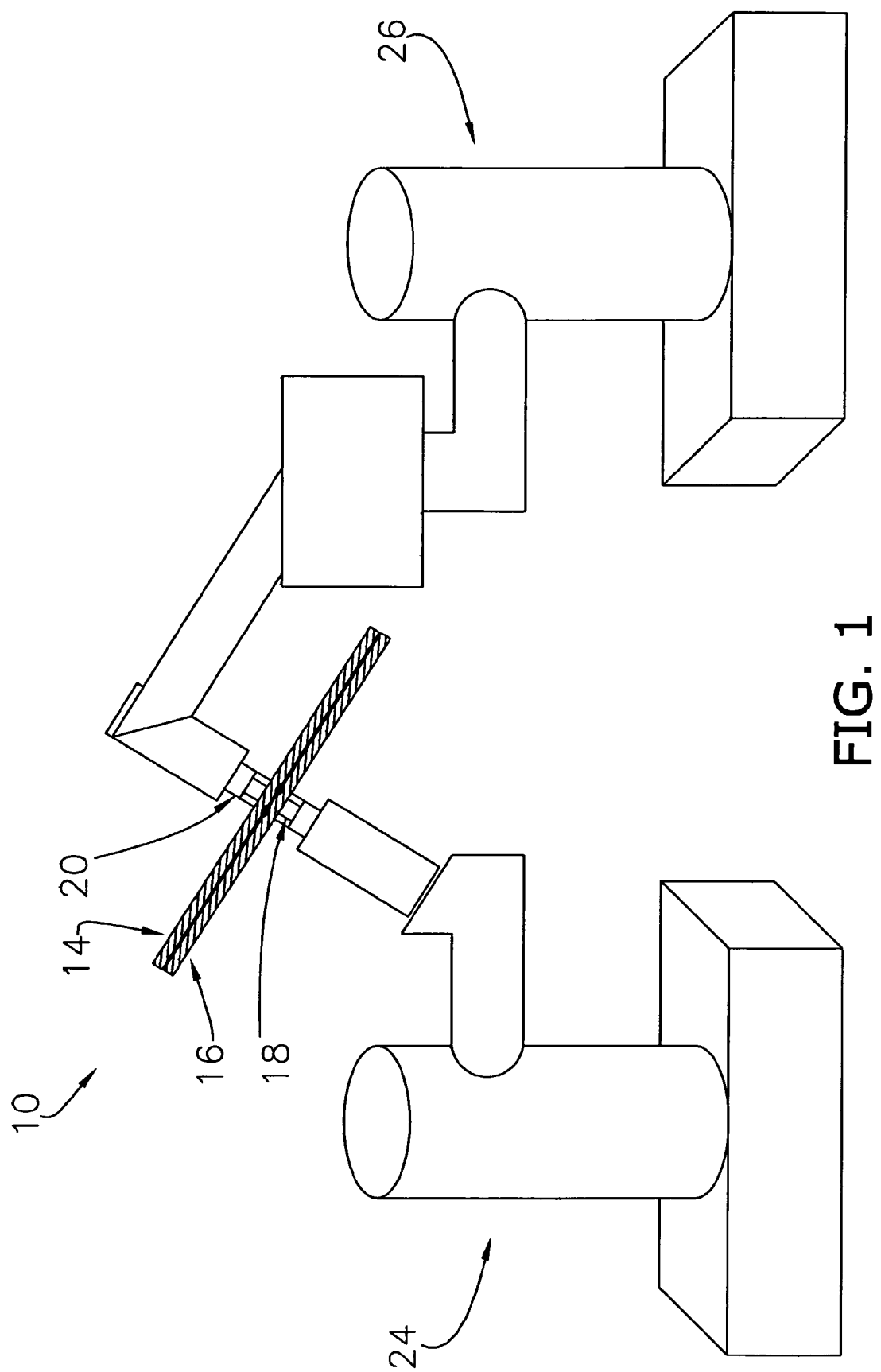
FIG. 1 is an elevational view of a clamping and spot welding system in accordance with a preferred embodiment of the present invention, particularly illustrating a two-robot system.
Figure 1A:
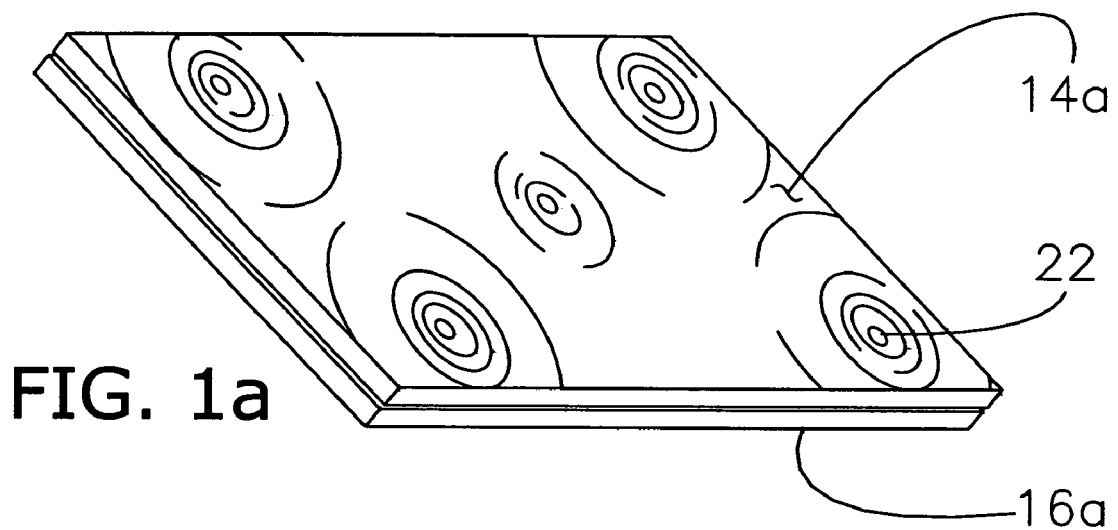
FIG. 1a is a perspective view of a plurality of workpieces, particularly illustrating exemplary datum locations.

The present invention concerns an improved resistance welding system 10 for welding a plurality (i.e., two or more) of adjacent workpieces, such as automotive sheet metal and engine cradle parts, to produce a spot or seam weld 12 (see, FIG. 1). In the illustrated embodiments, a plurality of two workpieces 14,16 of equal thickness is shown; however, the system 10 may be utilized to weld a greater plurality or structural components having variable thickness. The workpieces may be formed of a wide range of materials including steel, iron alloys, aluminum alloys, magnesium alloys, titanium and molybdenum. As best shown in FIG. 1a, the sheet metal workpieces 14,16 are configured to present oppositely engageable surfaces 14a and 16a. The surfaces 14a,16a are exposed to the system 10, and may be parallel or convergent.

Turning to the configuration of the system 10, a clamping element 18 is provided for engaging the workpieces 14,16 at a first location defined by the area of engagement (i.e. imprint), so as to secure the workpieces 14,16 in fixed relative positions. At least one electrode 20 is configured to produce the weld 12 substantially adjacent the first location, wherein the term "substantially adjacent" shall mean within 1 cm, and more preferably, within 1 to 2 mm of the imprint. Although described and illustrated herein with respect to spot welding, it is appreciated that the inventive aspects of the system 10 may be utilized with other compressive joining means, such as weldbonding, riveting, rivetbonding, clinching or clinchbonding, so that workpiece deformation is reduced by joining the workpieces 14,16 substantially adjacent the clamping location.

More preferably, the element 18 and electrode 20 are cooperatively configured to produce a radially symmetric weld 12 about the first location, and the first location is centered at a predetermined datum point 22 (using a conventional finite analysis method, for example). It is appreciated by those ordinarily skilled in the art that at these points clamping force is optimized and workpiece deformation due to clamping is minimized. A plurality of datum points 22 is typically determined in combination, so as to counterbalance each other (see, FIG. 1a).

Figure 2:
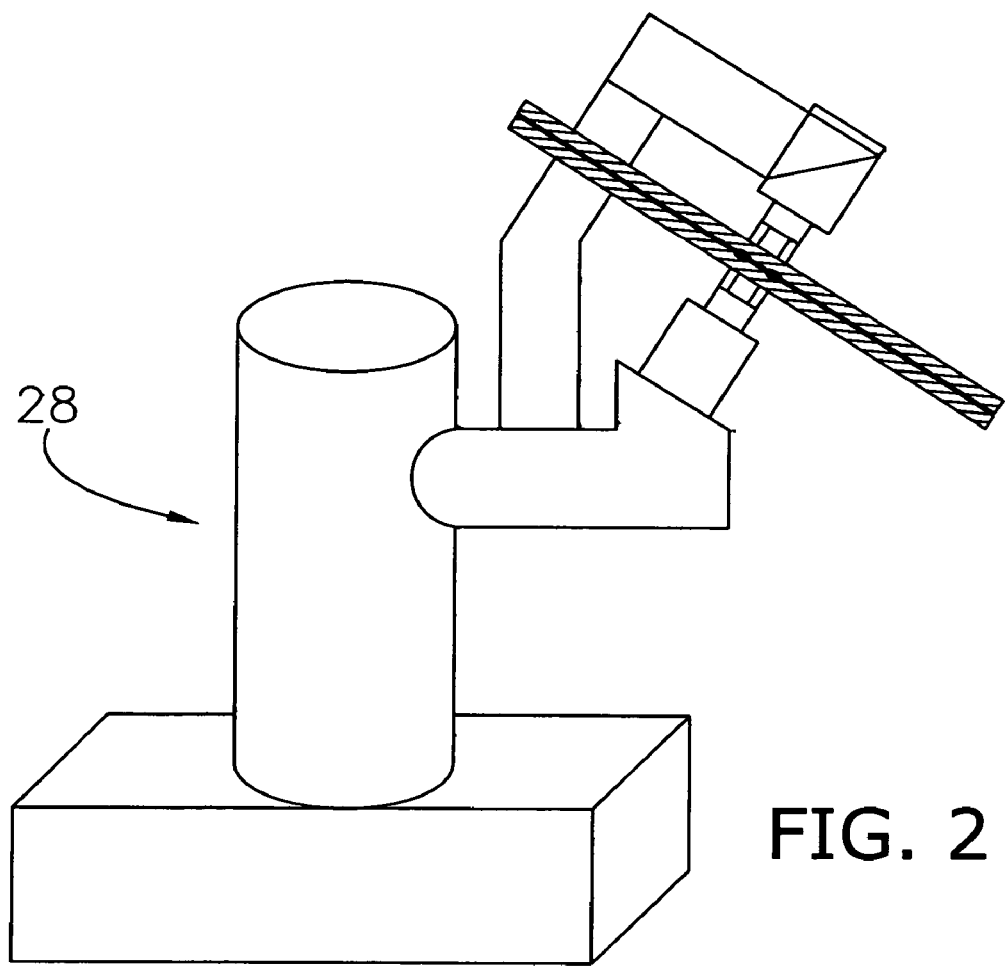
FIG. 2 is an elevational view of a clamping and spot welding system in accordance with a preferred embodiment of the present invention, particularly illustrating a one-robot system.

The system 10 may be manually controlled, or controlled by electro-mechanical means. More preferably, the system 10 is robotically operable along multi-axes and is programmably controlled, as illustrated in the one and two robot systems shown in FIGS. 1 and 2. In FIG. 1, the improved tooling configurations of the present system 10 enable the clamping and welding components to be cooperatively presented by a single set of two robots 24,26. It is appreciated that this dual component system increases floor space and thereby reduces spacial congestion within the assembly cell. More preferably, and as shown in FIG. 2, the dual component system may be further reduced and presented by a single programmable robot 28, wherein the preferred robot 28 is flexibly modifiable to accommodate a plurality of different applications.

In the illustrated embodiments, the preferred clamping element 18 has at least one degree of freedom relative to the workpieces 14,16, and defines at least two workpiece engaging surfaces. As shown in FIG. 3, the preferred element 18 includes first and second solid rods or tubes 30,32 defining enclosed blunt ends. The rods are coaxially aligned, and drivable by an actuator (not shown) towards the workpieces 14,16, so as to apply opposite compressive forces thereto. The surface area presented by each end determine the area of the imprints. The co-axis of the rods 30,32 preferably passes through a datum point. As previously described, it is appreciated that the imprint areas under compression experience no deformation during clamping (these areas shall herein be referred to as "datum locations"), and that centering these areas at datum points minimizes the total deformation due to clamping experienced by the remainder of the workpieces 14,16. Finally, the rods 30,32 preferably present an insulated outer cover, and more preferably, are entirely formed of non-conductive material.

In FIGS. 3 and 4, the system 10 further illustrates sets of resistance spot welding electrodes, which are singularly described herein with respect to electrodes 20 and 20a,b respectively. It is understood that the system 10 includes virtually identical backup electrodes that oppositely engage the workpieces 14,16, and complete the electric potential. As shown in FIG. 3, the preferred electrode 20 presents a tubular configuration, and is coaxially aligned with the rods 30,32. The preferred electrode 20 is telescopically coupled to rod 30, and more preferably, forms an outer sleeve relative thereto. That is to say, the electrode 20 presents an at least substantially continuous outer wall 34 that defines an inside diameter slightly greater than the outside diameter of the first rod 30. The preferred outer wall 34 produces an annular weld 12 and is configured such that the ratio of the inside diameter of the weld to the outside diameter ($D_1:D_2$) is not greater than 0.8. It is appreciated by those ordinarily skilled in the art that at these ratios the fatigue life of the spot weld in lap-shear generally remains constant. The electrode 20 is translatable between engaged and disengaged (shown by hidden line in FIG. 3) positions relative to the workpieces 14,16.

A plurality of electrodes may also be utilized in lieu of a single continuous wall electrode to produce a plurality of separate welds. In the illustrated embodiment shown in FIG. 4, two electrodes 20a,b are oriented so as to produce radially symmetric welds about the associated datum point, wherein it is further appreciated by those ordinarily skilled in the art that radial symmetry about the datum location is also required to minimize workpiece deformation. More particularly, the electrodes 20a,b are diametrically positioned substantially adjacent the first rod 30 (likewise, a plurality of three would be positioned so as to define one hundred twenty degree angles therebetween, etc.). The preferred electrodes 20a,b are individually actuated and configured, so as to separately and sequentially engage the workpiece 14, as shown in FIG. 4, if desired. Alternatively, however, the electrodes 20a,b may be integrally constructed and configured to present one of a plurality of radially symmetric and removably connectable patterns.

In an alternative embodiment of the system 10, wherein the workpieces 14,16 each define a hole and the holes are co-axially alignable to form a combined opening 36, the clamping element 18 includes an elongated pin 38 (see, FIG. 5). For reasons previously described, the preferred opening 36 is centrally located at a datum point. It is appreciated that a conventional perforating device, such as a drill or laser, may initially be utilized to effect this configuration, after the workpieces are secured.

As shown in FIG. 5, at least a distal portion of the pin 38 is configured to pass-through the opening 36, in the fully engaged position. To inhibit lateral inter-workpiece movement, the portion preferably presents a maximum engaged diameter equal to at least 90%, and more preferably, 95% of the opening diameter. To facilitate entry, the preferred pin 38 is longitudinally tapered over a distal portion 38a towards the distal end. The pin 38 preferably includes an insulated outer cover, and more preferably is homogenously formed of a non-conductive material, such as ceramic, to increase durability.

A backing block 40 interconnects with and supports the pin 38. In this configuration, the backing block 40 and a co-axially aligned electrode 20c oppositely engage the workpieces 14,16. The preferred block 40 and electrode 20c are cooperatively configured to form both the clamping and welding components (see, FIG. 5), and as such, the block 40 is conductive.

The electrode 20c presents a concaved distal end and defines an interior space configured to receive the inserted portion of the pin 38, when the electrode 20c is fully engaged. The engaging surface of the preferred electrode 20c is also defined by a continuous wall, and is configured to produce an annular weld 12, wherein the weld 12 is spaced from the opening to avoid interaction with the pin 38. Finally, the preferred pin 38 is removably coupled to the block 40, and presents one of a plurality of interchangeable pins. For example, the pin 38 may be threadably coupled to the block as further shown in FIG. 5.

More preferably, and as shown in FIG. 5*a*, to facilitate entry and utilization with openings of variable diameters, the preferred pin 38 is longitudinally tapered over a broader portion 38*a*, and is retractable within a recessed space defined by the backing block 40. The pin 38 is biased towards the fully un-retracted position by a spring 42 (or other biasing means) housed within the space. In the engaged position, the pin 38 bears upon the workpiece 16 so as to further secure the workpieces 14,16 in generally fixed and fixed positions, respectively. Most preferably, the portion 38*a* is tapered along one side only and is oriented such that upper workpiece 14 contacts the orthogonal side and is further secured thereby (see, FIG. 5*a*).

Thus, a preferred method of joining a plurality of adjacent workpieces is described, wherein at least one datum point for minimizing workpiece deformation due to clamping is predetermined. The workpieces are compressively clamped at a first location centered at a datum point, and joined substantially adjacent the first location. More preferably, the workpieces are joined by resistance spot welding, so as to produce at least one radially symmetric spot-weld. Most preferably, an electrode defining an at least substantially continuous wall engages the workpieces to produce an at least substantially annular weld.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to assess the scope of the present invention as pertains to any apparatus, system or method not materially departing from the literal scope of the invention set forth in the following claims.

What is claimed is:

1. A system for clamping and resistance spot welding a plurality of workpieces, said system comprising:
    a clamping element including first and second coaxially aligned and drivable rods, each presenting a distal end, and configured to engage the workpieces at a first location with the ends of the rods, so as to secure the workpieces in a relatively fixed position; and
    at least one electrode configured to engage by contacting, applying pressure to and passing an electric current through a section of the workpieces after the workpieces are secured in the fixed position,
    said element and electrode being cooperatively configured such that the section is spaced not more than one centimeter from the first location.

2. The system as claimed in claim 1,
    said element and the at least one electrode being telescopingly coupled and cooperatively configured to engage the workpieces in a concentrically aligned condition.

3. The system as claimed in claim 2,
    said at least one electrode defining a continuous wall configured to produce a substantially annular weld encircling the first location.

4. The system as claimed in claim 3,
    said weld presenting an inner diameter to outer diameter ratio not greater than 0.8.

5. The system as claimed in claim 1,
    said at least one electrode and element being interconnected and drivenly coupled to, and maneuverable by a single robotic apparatus, wherein said apparatus is programmably controllable and operable to autonomously position the element to the first location.

6. The system as claimed in claim 1,
    said workpieces defining and being configured to present concentrically alignable and adjacently positionable holes, so as to present an opening;
    said element including an insulated pin, at least a portion of which is configured to enter and pass-through the opening.

7. The system as claimed in claim 6,
    said at least one electrode defining an interior space at least substantially enclosed by an outer wall,
    said space being configured to receive the at least portion of the pin, when the pin is fully inserted through the opening, and the at least one electrode engages the section.

8. The system as claimed in claim 6,
    said pin presenting a distal end and being tapered towards the end.

9. The system as claimed in claim 8,
    said element including a backing block, wherein said block and the at least one electrode appositely engage the workpieces,
    said pin being retractably coupled to the block.

10. The system as claimed in claim 9,
    said pin being one of a plurality of interchangeable pins, said pins each being removably connectable to the block.

11. The system as claimed in claim 1,
    said element and the at least one electrode being cooperatively configured to retain the workpieces in the relatively fixed position, and cooperatively configured to pass the electric current through a section.

12. The system as claimed in claim 1; and
    the at least one electrode further comprising a second electrode configured to engage by applying pressure to and passing an electric current through a second section of the workpieces, wherein said second section is substantially adjacent the first location,
    said first and second sections being radially symmetric relative to the first location.

13. The system as claimed in claim 12,
    said first and second electrodes being individually actuated, so as to non-concurrently engage the workpieces.

* * * * *